United States Patent [19]

Shimizu

[11] Patent Number: 4,660,669

[45] Date of Patent: Apr. 28, 1987

[54] ELECTROMAGNETIC SERVO UNIT

[75] Inventor: Yasuo Shimizu, Tochigi, Japan

[73] Assignee: Honda Giken Kogyo Kabushiki Kaisha, Tokyo, Japan

[21] Appl. No.: 755,024

[22] Filed: Jul. 15, 1985

[30] Foreign Application Priority Data

Jul. 20, 1984 [JP] Japan .................... 59-150986

[51] Int. Cl.⁴ ............................................. B62D 5/04
[52] U.S. Cl. .................................. 180/79.1; 180/142; 74/388 PS
[58] Field of Search ................... 180/79.1, 141, 142, 180/143; 74/388 R, 388 PS, 626

[56]    References Cited

U.S. PATENT DOCUMENTS

| 4,241,804 | 12/1980 | Deininger et al. | 180/79.1 |
| 4,250,765 | 2/1981 | Niklaus et al. | 74/388 PS |
| 4,415,054 | 11/1983 | Drutchas | 180/79.1 |
| 4,448,275 | 5/1984 | Kitagawa et al. | 180/79.1 |
| 4,509,611 | 4/1985 | Kade et al. | 180/142 |

*Primary Examiner*—John J. Love
*Assistant Examiner*—Donn McGiehan
*Attorney, Agent, or Firm*—Armstrong, Nikaido, Marmelstein & Kubovcik

[57]    ABSTRACT

An electromagnetic servo unit (100) including a first shaft (12), a second shaft (7), an elastic member (21) interposed between the first and second shafts (12, 7) to interconnect them in a torque transmittable manner, a torque detection mechanism (5) for detecting input torque acting on either of the first and second shafts (12, 7), an electric motor (2) for developing assistant torque in accordance with a detection signal from the torque detection mechanism (5), and a torque transmission mechanism (3, 4) for transmitting the assistant torque to the second shaft (7). The servo unit (100) further comprises a direct coupling mechanism (39, 40, 23, 22, 12b-2) for directly coupling the first shaft (12) and the second shaft (7) to each other under a predetermined condition, to thereby effect direct torque transmission therebetween. The servo unit (100) is employed in a power steering system of a vehicle, and the direct coupling mechanism (39, 40, 23, 22, 12b-2) is adapted to directly couple the first and second shafts (12, 7) to each other in relation to the travelling speed of the vehicle. The direct coupling mechanism (39, 30, 23, 22, 12b-2) is adapted to directly couple the first and second shafts (12, 7) to each other when the vehicle is put in a high-speed travelling state.

17 Claims, 4 Drawing Figures

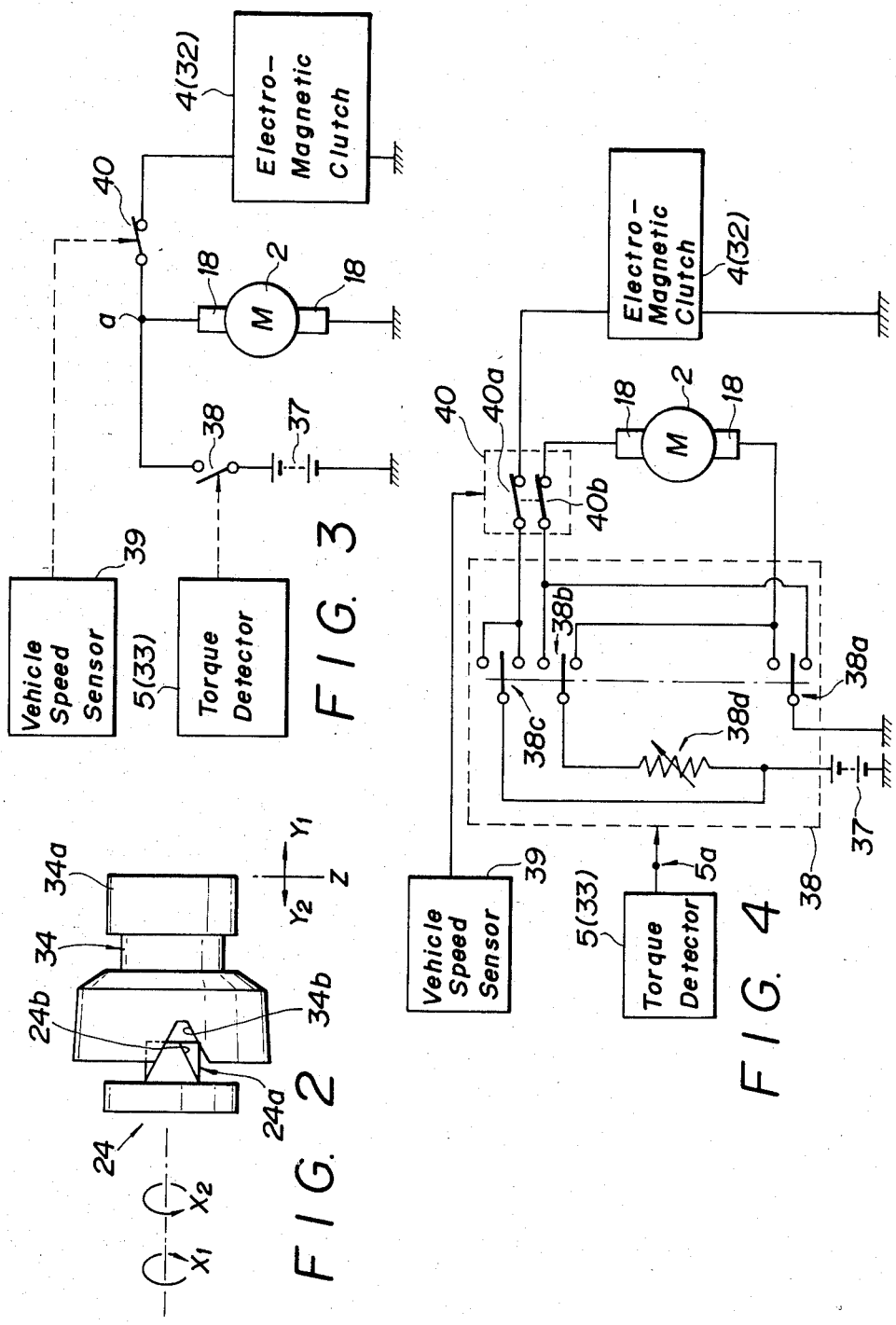

ELECTROMAGNETIC SERVO UNIT

BACKGROUND OF THE INVENTION

1. Field of the Invention

The present invention generally relates to a servo unit. More particularly, the invention relates to an electromagnetic servo unit adapted to be applied to a power steering system.

2. Description of Relevant Art

In general, those electromagnetic servo systems adapted to be applied to a power steering system of a vehicle are constituted with an input shaft adapted to be operatively connected to a steering wheel of the vehicle, an output shaft adapted to be operatively connected to a steering gearbox for a steerable road wheel of the vehicle, an elastic member interposed between the input shaft and the output shaft to interconnect them with each other in a torque-transmittable manner, a torque detector for detecting steering torque applied to the input shaft, and an electric motor for providing the output shaft with assistant torque in accordance with a detection signal from the torque detector.

As an example thereof, there is disclosed an electromagnetic servo system in U.S. Pat. No. 4,448,275 (Kitagawa et al, May 15, 1985).

In the electromagnetic servo system according to the aforesaid United States Patent, a torsion spring is employed as the elastic member interposed between the input shaft and the output shaft to couple them together. A torque sensor arranged on the input and output shafts is adapted to detect the steering torque applied to the input shaft, in the form of a relative angular displacement between the shafts, as it is measured in the circumferential direction of the shafts. The electric motor for providing the output shaft with the assistant torque is disposed independently of the shafts.

In a power steering system employing an electromagnetic servo system having a torsion spring interposed between an input shaft and an output shaft as in the servo system according to the aforesaid United States Patent, it is hardly possible to achieve a steering feeling like that in a steering system of a manual type in which no power assist device is provided or in other words the input and output shafts are constituted integral with each other.

Such a shortcoming is likewise found also in a power steering system employing an electromagnetic servo system using, in place of the torsion spring, an elastic member of a different kind.

With the foregoing points in mind and with a view that, in a power steering system of a type like above, it will constitute an advantage to provide a steering feeling of a manual type steering system under a certain condition, exemplarily when the vehicle speed is relatively high, the present invention is achieved to substantiate an improvement, particularly for a power steering system to which an electromagnetic servo unit of such a type as aforementioned is applied.

SUMMARY OF THE INVENTION

According to the present invention there is provided an electromagnetic servo unit (100) comprising an outer casing (1), a first shaft (12) and a second shaft (7) both rotatably fitted to the casing (1), an elastic means (21) interposed between the first shaft (12) and the second shaft (7), the elastic means (21) interconnecting the first shaft (12) and the second shaft (7) in a torque transmittable manner, a torque detecting means (5) for detecting input torque acting on either of the first shaft (12) and the second shaft (7), an electric motor means (2) for developing assistant torque in accordance with a detection signal from the torque detecting means (5), an assistant torque transmitting means (3, 4) for transmitting the assistant torque developed at the electric motor means (2) to the second shaft (7), and a direct coupling means (39, 40, 23, 22, 12b-2) for directly connecting the first shaft (12) and the second shaft (7) to each other under a predetermined condition, to thereby effect direct torque transmission therebetween.

Accordingly, an object of the present invention is to provide an electromagnetic servo unit which, when employed in a power steering system of a vehicle, can provide under the predetermined condition a steering feeling of a manual type steering system, thereby achieving favorable steering responsiveness.

The above and further objects, details and advantages of the present invention will become apparent from the following detailed description of a preferred embodiment of the invention when read in conjunction with the accompanying drawings.

BRIEF DESCRIPTION OF THE DRAWINGS

In the drawings

FIG. 2. shows an essential part of a torque detection mechanism of the servo unit, as viewed along arrow II, of FIG. 1;

FIG. 3 is a schematic connection diagram of a control circuit including an electric motor and an electromagnetic clutch of the servo unit of FIG. 1; and FIG. 4 is a detailed connection diagram of the control circuit, as partially modified, of FIG. 3.

DETAILED DESCRIPTION OF THE PREFERRED EMBODIMENT

Figure 1:
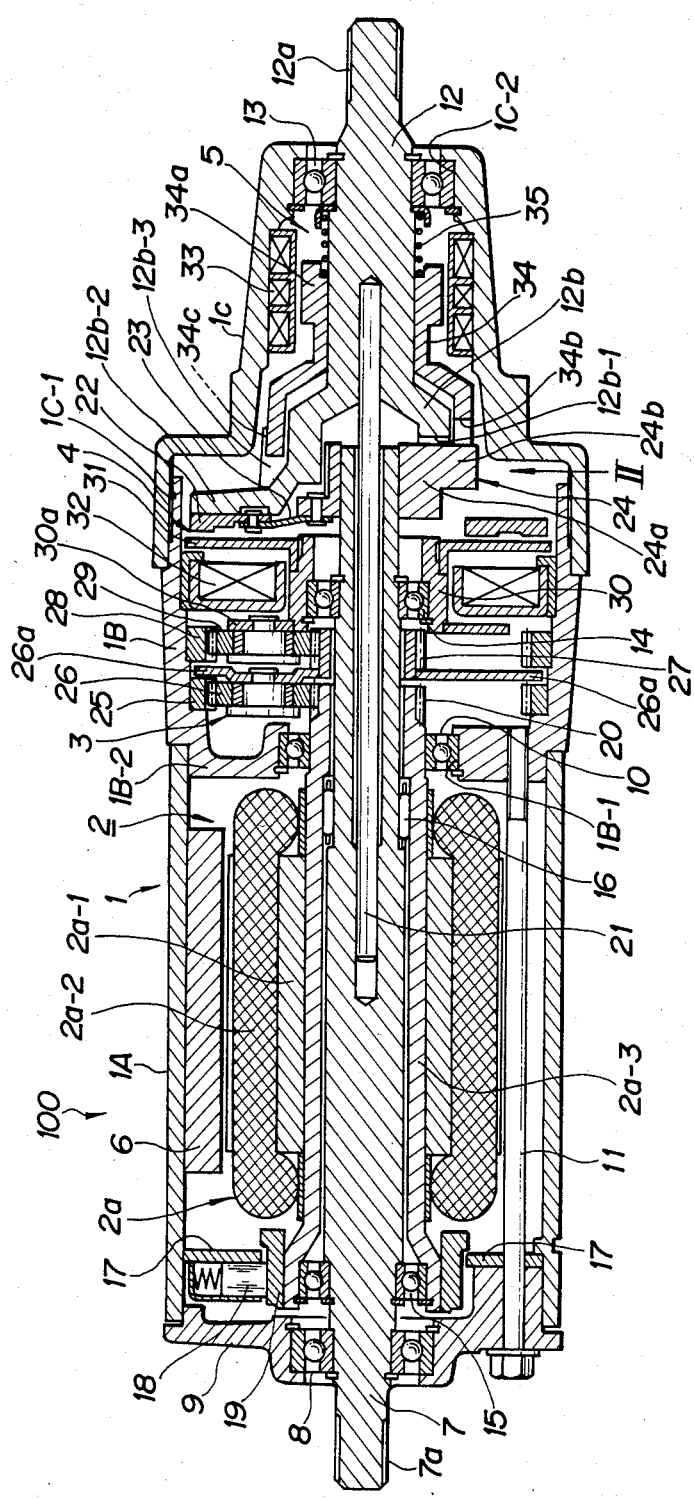
FIG. 1 shows a quarter-cutaway longitudinal section of an electromagnetic servo unit according to the preferred embodiment of the invention.

Referring first to FIG. 1, designated at reference numeral 100 is the entirety of an electromagnetic servo unit according to a preferred embodiment of the invention. The servo unit 100 has a cylindrical casing 1 constituting an outside member of the entire unit. The casing 1 consists of an outside yoke 1A as a first casing portion having an electric motor 2 built therein, a second casing portion 1B accommodating as principal constituent parts therein a reduction gearing 3 and an electromagnetic clutch 4, and a third casing portion 1C including a mechanism 5 serving as a detector for torque detection.

The yoke 1A is provided with at least one pair of permanent magnets 6 fixed as magnet poles to the inside circumference thereof, at symmetrical points thereon, the magnets 6 constituting a field of the electric motor 2. At the left end of the yoke 1A in FIG. 1, to the opening thereof is attached a lid member 9 with a bearing 8 for supporting therethrough the left part of a second shaft 7. At the left end of the second casing portion 1B, at which a central aperture 1B-1 is formed through an end face part 1B-2 thereof to fix therein a bearing 10, the outer circumference of the end face part 1B-2 is fitted in the opening at the right end of the yoke 1A, while this part 1B-2 of the second casing portion 1B and the lid 9 of the yoke 1A are integrally fastened to each other with a pair of relatively long bolts 11 disposed at symmetrical positions with respect to the axis of the servo unit 100. The third casing portion 1C has, at the left end thereof, an opening part 1C-1 screwed on the right opening end part of the second casing portion 1B and, at the right end thereof, an end part 1C-2 fixing therein a bearing 13 for supporting therethrough the right part of a first shaft 12.

The second shaft 7, which is rotatably supported at the left part thereof through the bearing 8 by the casing 1, has at the left end thereof a spline 7a formed thereon for an external member (not shown) to be coupled thereto. Along and around the second shaft 7 is-provided a rotor 2a rotatably supported by the combination of a ball bearing 15 and a needle bearing 16, the bearings 15, 16 being both fitted on the second shaft 7. The rotor 2a, as an armature of the electric motor 2, comprises a laminated steel core as an armature core 2a-1 with a plurality of axial slots (not shown) formed in the outer circumference thereof, and an armature winding 2a-2 provided through the slots.

Inside the left opening end part of the yoke 1A, there is fixed thereto an annular plate 17 which is provided on the left side thereof with a pair of brushes 18 secured thereto and arranged symmetrical to each other with respect to the axis of the servo unit 100. On the other hand, as a constituent part for fitting thereon the armature core 2a-1, the rotor 2a further comprises a central cylindrical portion 2a-3 which has fixed on the left end part thereof a slip-ring commutator 19 electrically connected in a suitable manner to the armature winding 2a-2. The brushes 18 are brought into slidable contact with the commutator 19, so that electric current is adequately sent into the winding 2a-2 through the combination of the brushes 18 and the commutator 19. When excited with electric current fed, the winding 2a-2 cooperates with the permanent magnets 6 to produce electromagnetic torque, that is, a tendency to rotate the rotor 2a in either direction as required.

The first shaft 12, which is rotatably supported at the right part thereof by the bearing 13 and outwardly projected from the right end part 1C-2 of the third casing portion 1C, has at the rightwardly projected end thereof a spline 12a formed thereon for an external member (not shown) to be coupled thereto. In the left part of the first shaft 12, there is formed a radially expanded cylindrical portion 12b opening leftwardly. The cylindrical portion 12b has formed at the left end thereof, at each alternate one of those angular positions thereof angularly spaced apart at phase differences of 90°, a notch 12b-1 and, at each remaining one thereof, a radially outwardly extending projection 12b-2 of a centrally-cut sectorial shape, which projection 12b-2 in turn has at the rear side thereof a key 12b-3 formed thereon.

At the right end of the second shaft 7, there is provided therearound a sheet of annular first clutch plate 22 attached thereto through a pair of sheets of leaf springs 23 shaped in a centrally-cut sectorial form, the springs 23 extending radially outwardly of the shaft 7 in a symmetrical relation to each other with respect to the axis of the shaft 7. Each of the leaf springs 23, that is axially resilient to the right and adapted to normally bias the first clutch plate 22 toward the projection 12b-2, has great rigidity against torsional forces tangentially exerted thereon between the first shaft 12 and the second shaft 7.

Further, at the right end of the second shaft 7, there is fixedly fitted thereon a cam member 24 having an axially projected cam portion (which portion in FIG. 1 is shown in a stressed manner at the under side of the shaft 7) toward the first shaft 12 at each angular position thereof at phase differences of 90° relative to the leaf springs 23, to which cam member 24 are fixed the springs 23. More particularly, as shown in FIG. 2, the cam portion has, at the radially inner side of the cam member 24, an inner part 24a of a substantially rectangular form and, at the radially outer side thereof, an outer part 24b substantially of a wedge form. The rectangular part 24a is engaged with the notch 12b-1 cut in the left cylindrical portion 12b of the first shaft 12, with a proper circumferential gap left therebetween.

The first shaft 12 and the second shaft 7 are coaxially arranged with each other and elastically connected through a torsion bar 21 to each other. Accordingly, when the first shaft 12 operatively connected to a steering wheel (not shown) of a vehicle (not shown), equipped with the servo unit 100, is subjected to external torque in either rotational direction, the torsion bar 21 transmits the torque to the second shaft 7, so that there is developed a relative angular displacement or phase difference between the shafts 7, 12 in accordance with a load born by the second shaft 7. When the relative angular displacement is developed to a predetermined angle, the rectangular part 24a of the cam member 24 secured to the second shaft 7 is brought into abutment with a shoulder part of the notch 12b-1 of the cylindrical portion 12b of the first shaft 12. Consequently, as the first shaft 12 is further rotated in the aforesaid either direction, the second shaft 7 is caused to integrally rotate therewith. In other words, the servo unit 100 includes a fail-safe mechanism comprising the combination of the rectangular part 24a of the cam member 24 and the notch 12b-1 of the first shaft 12.

The reduction gearing 3 comprises a series of two stages of planetary gearing: a first stage consisting of a first sun gear 20 formed at the right end of the central cylindrical portion 2a-3 of the rotor 2a, a first ring gear 25 fixed to the inner circumference of the second casing portion 1B, and a trio of first planet gears 26 interposed between, to be engaged with, the sun gear 20 and the ring gear 25; and a second stage consisting of a second sun gear 27 integrally fitted in the central part of an annular support member 26a supporting the first planet gears 26, a second ring gear 28 fixed to the inner circumference of the second casing portion 1B, and a trio of second planet gears 29 interposed between, to be engaged with, the sun gear 27 and the ring gear 28. The second planet gears 29 are supported by a radially outwardly flanged portion 30a of a tubular member 30, which member 30 is rotatably supported by a bearing 14 fitted on the second shaft 7. The tubular member 30 has at the right end thereof a second clutch plate 31 secured thereto, the clutch plate 31 opposing the first clutch plate 22, with a predetermined space normally left therebetween.

The electromagnetic clutch 4 comprises the first and second clutch plates 22, 31 and an electromagnetic solenoid 32 of an annular form arranged at the left side in FIG. 1 of the second clutch 31 and spaced apart therefrom to provide a predetermined air gap therebetween. The solenoid 32 is secured to the inner circumference of the second casing portion 1B, while the first clutch plate 22 is normally biassed, with the resiliency of the leaf springs 23, to be forced into contact with the sectorial projection 12b-2 of the left cylindrical portion 12b of the first shaft 12. When the solenoid 32 is energized, the first clutch plate 22 is thereby attracted, against resilient forces of the leaf springs 23, to be integrally engaged with the second clutch plate 31.

The torque detection mechanism 5 comprises a differential transformer 33 fixed to the inner circumference of the third casing portion 1C, and a mobile member 34 with a land portion 34a movable in the axial direction of the servo unit 100 relative to the differential transformer 33. This mechanism 5 is adapted, as described below, to detect the magnitude of torque developed between the first shaft 12 and the second shaft 7, by converting same into an axial displacement of the mobile member 34.

The mobile member 34, which is axially slidably fitted on the first shaft 12, is normally biassed to the left in FIG. 1 with a coil spring 35. The left part of the mobile member 34, which part is shaped in a radially expanded form, has cut in the left edge thereof, at each corresponding angular position thereof, a wedge-formed cam groove 34b engaged as shown in FIG. 2 with the wedge-like part 24b of the cam member 24 and, at each of those angular positions thereof angularly spaced at phase differences of 90° relative to the cam groove 34b, a key slot 34c engaged with the key 12b-3 of the cylindrical portion 12b of the first shaft 12, which key engagement permits the mobile member 34 to slide in the axial direction only.

In FIG. 2, the cam member 24 and the mobile member 34 are shown to clearly represent a below-defined positional relation therebetween, while omitting other associated parts. Namely, in the servo unit 100 it is supposed that, while the members 24, 34 are put in the positional relation shown in FIG. 2, there is not developed any relative angular displacement nor phase difference between the first shaft 12 and the second shaft 7.

When external torque is applied to counterclockwise rotate the first shaft 12 as viewed from the right in FIGS. 1 and 2, then promptly the first clutch plate 22 is disengaged from the sectorial projection 12b-2 and, therefore, the torque as applied to the first shaft 12 is transmitted through the torsion bar 21 to the second shaft 7, so that this shaft 7 is rotated counterclockwise in accordance with a load thereon, with a delay relative to counterclockwise rotation of that shaft 12. Accordingly, the cam member 24, which is fixed on the second shaft 7, is correspondingly rotated clockwise relative to the mobile member 34, which is slidably fitted on the first shaft 12 and movable in no more than the axial direction thereof with respect to the shaft 12, or in other words, that member 24 is made to rotate relative to this member 34 in the direction X1 in FIG. 2. Concurrently, due to tapered engagement between the wedge-like part 24b of the cam member 24 and the wedge-formed cam groove 34b of the mobile member 34, this member 34 is caused to slide to the right, that is, in the direction Y1 in FIG. 2, against the coil spring 35. Incidentally, in FIG. 2, represented by reference character Z is the axial position of the right end of the land portion 34a of the mobile member 34, when no relative angular displacement is developed between between the first shaft 12 and the second shaft 7.

In the case where external torque tending to produce clockwise rotation is applied to the first shaft 12, then the above-described rotational directions are reversed, so that the cam member 24 is made to counterclockwise rotate relative to the mobile member 34, that is, in the direction X2 in FIG. 2, and concurrently this member 34 being urged to the left, that is, in the direction Y2 in FIG. 2 by the coil spring 35 is permitted to slide in this direction.

Based on such axial movements of the mobile member 34, the magnitude as well as rotational direction of torque developed between the first shaft 12 and the second shaft 7 is detected with the torque detection mechanism 5 which has necessary electric circuits for torque detection, including the differential transformer 33.

Referring now to FIG. 3, which is a schematic representation of a control circuit of the servo unit 100, according to the torque developed between the shafts 7, 12, as it is detected in its magnitude and rotational direction by the torque detection mechanism 5 as a torque detector including the differential transformer 33, a detection signal thereof is output to turn on a switch 38, which is installed in an electric line from a power source 37 to a terminal a leading to the armature winding 2a-2 of the electric motor 2, the terminal a shunting a line to the solenoid 32 of the electromagnetic clutch 4, thus conducting electric current thereto. Accordingly, the motor 2 has developed electromagnetic torque with which, as designed, the rotor 2a is rotated in the rotational direction of the external torque acting on the first shaft 12, and concurrently the solenoid 32 of the clutch 4 is energized, subject to a later-described condition, to bring the first clutch plate 22 into integral engagement with the second clutch plate 31, so that the electromagnetic torque of the motor 2 is additionally applied through the reduction gearing 3 and the clutch 4 to the second shaft 7. As a result, when external torque is acting on the first shaft 12, according to predetermined conditions an assist power is given in the form of additive electromagnetic torque as developed at and transmitted from the electric motor 2 to the second shaft 7, which thus has magnified torque acting thereon.

In the foregoing servo system, the actuation of the electromagnetic clutch 4 or the sending of electric current to the solenoid 32 thereof is provided under a particular condition: as shown in FIG. 3, in the shunting line to the clutch 4 there is installed an on-off switch 40 operable with an output signal from a known vehicle speed sensor 39 of any type of vehicle, such that it is kept on when the vehicle speed is relatively high and stands off while this is relatively low. Therefore, in the application of the servo unit 100 to a power steering system of a vehicle, while the vehicle is running at low speeds, the unit 100 as it has energized both the electric motor 2 and the electromagnetic clutch 4 can serve as a torque magnifier and, at high speeds, it can be used, without effecting torque magnification, as a coupling directly interconnecting the first shaft 12 with the second shaft 7, that is, as a direct coupling device interposed therebetween.

The function of the electromagnetic clutch 4 will be again described below in other words.

While the vehicle speed is relatively low, at the time when the first shaft 12 is caused to initiate rotation thereof with external torque applied thereto, the solenoid 32 of the clutch 4 makes the first clutch plate 22, which is inherently attached to the second shaft 7 and has been occasionally engaged before then with the centrally-cut sectorial projection 12b-2 of the first shaft 12, engage with the second clutch plate 31. Accordingly, the external torque acting on the first shaft 12 is transmitted to the second shaft 7, while being magnified by means of the electric motor 2, so that this shaft 7 has larger torque acting thereon than the torque applied to that shaft 12.

On the other hand, while the vehicle speed is relatively high, the solenoid 32 of the clutch 4 is left deenergized, so that the first clutch plate 22 is kept in contact engagement with the sectorial projection 12b-2 of the first shaft 12. In this respect, in addition to the fact that the leaf springs 23 supporting the first clutch plate 22 are high in rigidity in the torsional or tangential direction, the mutually engaging contact surfaces of the first clutch 22 and the projection 12b-2, which have a very high coefficient of friction, cooperate to establish such a condition that the first shaft 12 is substantially secured to be coupled to the second shaft 7. As a result, external torque acting on the first shaft 12 is directly transmitted to the second shaft 7.

Incidentally, in FIG. 3, the switch 38 is practically adapted to control the amperage as well as direction of electric current to be fed to the armature winding 2a-2 of the electric motor 2 in accordance with the detection signal derived from the differential transformer 33 of the torque detector 5. Further, the switch 40, which has been hereto adapted to effect an on-off control of the electromagnetic clutch 4 in accordance with the output signal of the vehicle speed sensor, may preferably be disposed in front of the shunting terminal a to provide an on-off control for both the motor 2 and the clutch 4. According to such partial modification, an exemplary block diagram is shown in FIG. 4, in which the circuitry of FIG. 3 is given in a more practical manner, particularly with respect to the connection of the switch 38, while like parts are represented by like reference numerals.

Referring to FIG. 4, designated now at reference numeral 38 is a switching circuit. The switching circuit 38 comprises a trio of changeover switches 38a, 38b, 38c operable all at the same time in the same changeover direction with each of a pair of solenoid actuators (not shown) to be energized and deenergized in accordance with on-off actions of a pair of relays (not shown) controlled by the detection signal from the torque detector 5, and a variable resistor 38d variable in the resistance thereacross in accordance with the detection signal of the torque detector 5, the resistor 38d being interposed between one 38b of the changeover switches and the external power source 37. There is provided another switching circuit 40 comprising a pair of on-off switches 40a, 40b operable both at the same time to be made off when an unshown solenoid actuator is energized, which actuator is able to be energized and deenergized in accordance with an on-off action of a relay (not shown) controlled by the output signal sent from the vehicle speed sensor 39. Of the switching circuit 40, one 40a of the on-off switches is adapted to connect the switching circuit 38 to the solenoid 32 of the electromagnetic clutch 4, and the other switch 40b thereof, for connection from the circuit 38 to one of the paired brushes 18, 18 of the electric motor 2.

In FIG. 4, the switching circuits 38, 40 are shown as they are in a state of the servo unit 100, in which no torque is applied to the first shaft 12, while the vehicle speed is relatively low. In this state, the on-off switches 40a, 40b are both made on, and the changeover switches 38a, 38b, 38c are all set in neutral positions thereof.

While the vehicle speed is kept relatively low, when external torque of a certain magnitude is applied to rotate the first shaft 12 in either rotational direction, then concurrently the detection signal of the torque detector 5 is fed to the switching circuit 38, where it causes all the changeover switches 38a, 38b, 38c to be changed over in one direction, to become on, in accordance with the rotational direction of the external torque. As a result, the electromagnetic clutch 4 is energized, and at the same time the electric motor 2 is supplied with an electric current of a predetermined amperage in either direction, as necessary, whereby as aforementioned the servo unit 100 can effect torque magnification.

Further, while the vehicle speed is still kept relatively low, when external torque of a certain magnitude is applied to rotate the first shaft 12 in the opposite rotational direction, then the changeover switches 38a, 38b, 38c are all changed over in the opposite direction to again become on, whereby the second shaft 7 has resultant torque of a predetermined magnitude acting thereon in the opposite rotational direction with respect to the rotation thereof in the former case.

On the other hand, when the vehicle speed is shifted to be relatively high, the on-off switches 40a, 40b become off as described above, so that the motor 2 will not be started and the clutch 4 is kept in a disengaged state irrespective of the circuit condition of the switching circuit 38. In the disengaged state of the clutch 4, in which the first clutch plate 22 is in contact engagement with the sectorial projection 12b-2 of the first shaft 12, external torque acting on the first shaft 12 is substantially directly transmitted to the second shaft 7 as already described.

In the foregoing example, the switching circuit 40 is disposed behind the switching circuit 38, as shown in FIG. 4. In this respect, according to a still further modified example, from the viewpoint of power consumption, such a switching circuit as the circuit 40 may preferably be placed at a point where the detection signal from the torque detector 5, as it is sent substantially directly therefrom, can be on-off controlled, that is, not behind the switching circuit 38 but nearer to the detector 5 than the circuit 38, exemplarily at a point 5a of FIG. 4.

However, in both of the modified examples, when no relative angular displacement between the first shaft 12 and the second shaft 7 is represented by the detection signal from the torque detector 5, as it is sent to the switching circuit 38, then neither of the unshown paired solenoid actuators in this circuit 38 is energized to be urged for actuation, so that the changeover switches 38a, 38b, 38c are all kept in the neutral positions thereof. Such a state will result also when the detection signal itself from the torque detector 5 is not present.

Further, in the foregoing embodiment, the first shaft 12 is employed as an input shaft, and the second shaft 7, as an output shaft. In this respect, in another modification, the first shaft 12 and the second shaft 7 may advantageously be used as an output shaft and an input shaft, respectively.

As will be understood from the foregoing description, according to the present invention, in the electromagnetic servo unit 100 including the rotatable first shaft 12, the rotatable second shaft 7, the torsion bar 21 interposed between the shafts 7, 12, and the electric motor 2, at relatively low vehicle speeds the motor 2 has an output thereof in the form of torque supplementarily applied through the reduction gearing 3 and the electromagnetic clutch 4 to the second shaft 7 and at relatively high vehicle speeds the first and second shafts 12, 7 are substantially directly coupled together through a direct coupling mechanism constituted with the leaf springs 23, the first clutch plate 22, and the sectorial projection 12b-2. As a result, for the driver of a vehicle under a high-speed condition, there may well be advantageously achieved a steering feeling like that in a steering system of a manual type without power assist.

In this respect, in the case where a steering feeling of a manual type steering system is desired to be achieved under another condition than described above, the servo unit 100 may be modified to be conformingly implemented by use of a suitable sensor and a processing device.

For example, where for the driver of a vehicle a steering feeling of a manual system is desired to be achieved only when the loaded weight of the vehicle is smaller than a predetermined weight, the servo unit 100 may be so modified by means of a suitable sensor capable of detecting the loaded weight, such as a vehicle level sensor or an in-tire air pressure sensor.

Particularly, where a manual steering feeling is desired to be voluntarily achieved for the driver, there may be preferably employed a modification in which a manually operable on-off switch is placed at the point 5a of FIG. 4.

Furthermore, the electromagnetic servo unit 100 according to the present invention has built therein those devices adapted for providing the second shaft 7 with supplementary torque, including the electric motor 2, the reduction gearing 3, and the electromagnetic clutch 4. In this respect, when compared with the aforementioned electromagnetic servo system according to U.S. Pat. No. 4,448,275, the servo unit 100 is implemented to be designed more compact and facilitated in respect of the assembly work to power steering systems.

It will be apparent that the present invention may be applied also to an electromagnetic servo unit which has an elastic member interposed between input and output shafts, the elastic member being of a kind different from the torsion bar 21.

A principal feature of the present invention resides in that a servo unit for a vehicle has input and output shafts thereof adapted to be directly coupled to each other while the vehicle is travelling at relatively high speeds. In this respect, the present invention may be advantageously applied to a hydraulic type servo system, as well.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

I claim:
1. An electromagnetic servo unit comprising:
a first shaft and a second shaft;
torque detecting means for detecting a torque exerted on said first shaft so as to generate an output signal responsive to the detected torque, said torque detecting means including an elastic member for elastically connnecting said first shaft and said second shaft with each other;
electric power assist means for generating an assistant torque in accordance with said output signal from said torque detecting means; and
selective coupling means for selectively coupling said second shaft directly with said first shaft for direct torque transmission therebetween or with said electric power assist means for transmission of assistant torque therefrom to said second shaft.

2. An electromagnetic servo unit according to claim 1, wherein said selective coupling means comprises an electromagnetic clutch and clutch control means for controlling said electromagnetic clutch.

3. An electromagnetic servo unit according to claim 1, wherein said electric power assist means comprises:
an electric motor;
gearing means for transmitting assistant torque of said electric motor to said selective coupling means; and
motor control means for controlling said electric motor.

4. An electromagnetic servo unit according to claim 3, further comprising a casing, wherein:
said first shaft and said second shaft are rotatably supported in said casing and arranged in coaxial relation with each other;
said elastic member comprises a torsion bar arranged in coaxial relation with said second shaft and having one end connected to said first shaft and another end connected to said second shaft; and
said electric motor has a field magnet mounted on and disposed in said casing and a rotor cooperating with said field magnet, said rotor including a third shaft rotatably carried on and arranged coaxially with said second shaft and an armature winding mounted on said third shaft.

5. An electromagnetic servo unit according to claim 3, wherein said electromagnetic clutch comprises:
a first clutch plate axially movably connected to said second shaft through a plurality of leaf springs disposed radially around said second shaft, said plurality of leaf springs being high in rigidity with respect to torsional forces acting on said second shaft;
a second clutch plate axially fixed to and rotatably carried on said second shaft, and drivingly connected with said gearing means of said electric power assist means, said second clutch plate opposing said first clutch plate;
an end portion of said first shaft opposing said second clutch plate and spaced therefrom in such a manner that said first clutch plate is movable in the axial directions of said second shaft between respective positions of engagement of said first clutch plate with said first shaft end portion and of engagement of said first clutch plate with said second clutch plate, said first clutch plate being normally urged by said plurality of leaf springs into engagement with said end portion of said first shaft; and
a solenoid for selectively moving said first clutch plate in axial directions of said second shaft.

6. An electromagnetic servo unit according to claim 2, wherein said clutch control means comprises:
a speed detecting means for detecting the speed of a vehicle so as to generate an output signal responsive thereto; and
an actuator means for actuating said electromagnetic clutch in response to said output signal from said speed detecting means.

7. An electromagnetic servo unit according to claim 6, wherein said actuator means is capable of actuating said electromagnetic clutch so as to directly connect said first shaft and said second shaft with each other when the speed of said vehicle excees a predetermined value, and to directly connect said second shaft and said electric power assist means with each other when the speed of said vehicle does not exceed said predetermined value.

8. An electromagnetic servo unit according to claim 7, wherein said electric power assist means comprises:
an electric motor;
gearing means for transmitting the assistant torque of said electric motor to said selective coupling means; and
motor control means for controlling said electric motor.

9. An electromagnetic servo unit according to claim 8, further comprising a casing, wherein:
said first shaft and said second shaft are rotatably supported in said casing and arranged in coaxial relation to each other; and
said elastic member comprises a torsion bar arranged in coaxial relation to said second shaft and having one end connected to said first shaft and another end connected to said second shaft;
said electric motor having a field magnet mounted on and disposed in said casing and a rotor cooperating with said field magnet, said rotor including a third shaft rotatably carried on and arranged coaxially with said second shaft and an armature winding mounted on said third shaft.

10. An electromagnetic servo unit according to claim 8, wherein said electromagnetic clutch comprises:
a first clutch plate axially movably connected to said second shaft through a plurality of leaf springs disposed radially around said second shaft, said plurality of leaf springs being high in rigidity with respect to torsional forces acting on said second shaft;
a second clutch plate axially fixed to and rotatably carried on said second shaft, and drivingly connected with said gearing means of said electric power assist means, said second clutch plate opposing said first cluth plate;
an end portion of said first shaft opposing said second clutch plate and spaced therefrom in such a manner that said first clutch plate is movable in the axial directions of said second shaft between respective positions of engagement of said first clutch plate with said first shaft end portion and of engagement of said first clutch plate with said second clutch plate, said first clutch plate being normally urged by said plurality of leaf springs into engagement with said end portion of said first shaft; and
a solenoid for selectively moving said first clutch plate in axial directions of said second shaft.

11. In a power steering system of a vehicle having a steering wheel and at least one steerable road wheel, an electromagnetic servo unit comprising:
a first shaft operatively connected to said steering wheel;
a second shaft operatively connected to said at least one steerable road wheel;
torque detecting means for detecting a torque exerted on said first shaft so as to generate an output signal responsive to the detected torque, said torque detecting means including an elastic member for elastically connecting said first shaft and said second shaft with each other;
electric power assist means for generating an assistant torque in accordance with said output signal from said torque detecting means; and
selective coupling means for selectively coupling said second shaft directly with said first shaft for direct torque transmission therebetween or with said electric power assist means for transmission of assistant torque therefrom to said second shaft.

12. An electormagnetic servo unit according to claim 11, wherein said selective coupling means comprises an electromagnetic clutch and clutch control means for controlling said electromagnetic clutch.

13. An electromagnetic servo unit according to claim 12, wherein said clutch control means comprises a speed detecting means for detecting the speed of said vehicle so as to generate an output signal responsive thereto, and an actuator means for actuating said electromagnetic clutch in response to said output signal from said speed detecting means.

14. An electromagnetic servo unit according to claim 13, wherein said actuator means is capable of actuating said electromagnetic clutch so as to directly connect said first shaft and said second shaft with each other when the speed of said vehicle exceeds a predetermined value, and to directly connect said second shaft and said electric power assist means with each other when the speed of said vehicle does not exceed said predetermined value.

15. An electormagnetic servo unit according to claim 14, wherein said electric power assist means comprises:
an electric motor;
gearing means for transmitting the assistant torque of said electric motor to said selective coupling means; and
motor control means for controlling said electric motor.

16. An electromagnetic servo unit according to claim 15, further comprising a casing, wherein:
said first shaft and said second shaft are rotatably supported in said casing and arranged in coaxial relation to each other; and
said elastic member comprises a torsion bar arranged in coaxial relation to said second shaft and having one end connected to said first shaft and another end connected to said second shaft;
said electric motor having a field magnet mounted on and disposed in said casing and a rotor cooperating with said field magnet, said rotor including a third shaft rotatably carried on and arranged coaxially with said second shaft and an armature winding mounted on said third shaft.

17. An electromagnetic servo unit according to claim 15, wherein said electromagnetic clutch comprises:
a first clutch plate axially movably connected to said second shaft through a plurality of leaf springs disposed radially around said second shaft, said plurality of leaf springs being high in rigidity with respect to torsional forces acting on said second shaft;
a second clutch plate axially fixed to and rotatably carried on said second shaft, and drivingly connected with said gearing means of said electric power assist means, said second clutch plate opposing said first clutch plate;
an end portion of said first shaft opposing said second clutch plate and spaced therefrom in such a manner that said first clutch plate is movable in the axial directions of said second shaft between respective positions of engagement of said first clutch plate with said first shaft end portion and of engagement of said first clutch plate with said second clutch plate, said first clutch plate being normally urged by said plurality of leaf springs into engagement with said end portion of said first shaft; and a solenoid for selectively moving said first clutch plate in axial directions of said second shaft.

* * * * *